(12) United States Patent
Harland et al.

(10) Patent No.: US 8,922,486 B2
(45) Date of Patent: Dec. 30, 2014

(54) METHOD, SYSTEM AND APPARATUS FOR DETERMINING LOCATIONS IN A PROJECTED IMAGE

(75) Inventors: Charles Harland, Waterloo (CA); Kevin Wright, Waterloo (CA); Kevin Moule, Waterloo (CA)

(73) Assignee: Christie Digital Systems USA, Inc., Cypress, CA (US)

( * ) Notice: Subject to any disclaimer, the term of this patent is extended or adjusted under 35 U.S.C. 154(b) by 240 days.

(21) Appl. No.: 13/556,378

(22) Filed: Jul. 24, 2012

(65) Prior Publication Data

US 2014/0028553 A1 Jan. 30, 2014

(51) Int. Cl.
*G06F 3/033* (2013.01)
(52) U.S. Cl.
USPC .......................................................... 345/158
(58) Field of Classification Search
None
See application file for complete search history.

(56) References Cited

U.S. PATENT DOCUMENTS

| | | | |
|---|---|---|---|
| 7,137,707 B2 | 11/2006 | Beardsley et al. | |
| 7,486,274 B2 | 2/2009 | Forlines et al. | |
| 7,524,067 B2 | 4/2009 | Sato | |
| 7,862,179 B2 | 1/2011 | Shan et al. | |
| 8,049,721 B2 | 11/2011 | Tagawa | |
| 8,130,195 B2* | 3/2012 | Shelton et al. | 345/157 |
| 2001/0028342 A1* | 10/2001 | Notagashira | 345/157 |
| 2005/0151932 A1 | 7/2005 | Miyashita | |
| 2006/0284832 A1 | 12/2006 | Kuo | |
| 2010/0188333 A1 | 7/2010 | Capps | |
| 2011/0001701 A1 | 1/2011 | Nakano | |
| 2012/0182216 A1* | 7/2012 | Takamatsu et al. | 345/157 |

\* cited by examiner

*Primary Examiner* — Adam R Giesy
(74) *Attorney, Agent, or Firm* — Perry + Currier Inc.

(57) ABSTRACT

A method, system and apparatus for determining locations in a projected image are provided. The apparatus comprises a light sensor; a body comprising the light sensor, the body enabled to position the light sensor proximal to a screen to detect light from a projector; a communication interface for communicating with a projector system comprising at least the projector; and, a processor enabled to transmit a request to the projector system to project a structured light pattern using the projector; and when at least one pixel in the structured light pattern projected by the projector is detected at the light sensor, transmit a detection indication to the projector system to communicate detection of the at least one pixel.

20 Claims, 14 Drawing Sheets

METHOD, SYSTEM AND APPARATUS FOR DETERMINING LOCATIONS IN A PROJECTED IMAGE

FIELD

The specification relates generally to projection systems, and specifically to a method, system and apparatus for determining locations in a projected image.

BACKGROUND

Projection systems and/or screens are not always manufactured to an intended specification. For example edges of screens may not be straight as intended and/or projectors may not be mounted as designed. As such, a projected image may need to be manipulated to match the actual screen geometry through an iterative process of manually adjusting the projected image, viewing the resulting image projected at the screen and further adjusting the projected image. This can be very time consuming, processing intensive and does not always result in an acceptable accuracy of the projected image. Furthermore, blending two projected images together on complex and/or curved geometry is more complicated than on flat screens and the same iterative approach is required to ensure that all images are blended properly.

SUMMARY

An aspect of the specification provides an apparatus comprising a light sensor; a body comprising the light sensor, the body enabled to position the light sensor proximal to a screen to detect light from a projector; a communication interface for communicating with a projector system comprising at least the projector; and, a processor enabled to transmit a request to the projector system to project a structured light pattern using the projector; and when at least one pixel in the structured light pattern projected by the projector is detected at the light sensor, transmit a detection indication to the projector system to communicate detection of the at least one pixel.

The apparatus can further comprise a button, wherein the processor can be further enabled to transmit the request when the button is actuated.

The apparatus can further comprise one or more of: a telescoping accessory for extending the body; and mounting accessories for mounting the body to a device for moving the apparatus relative to the screen.

The light sensor can be enabled to detect one or more of light in a human visible spectrum, and an infrared light spectrum.

The light sensor can be enabled to detect colour and the detection indication can comprise a colour indication of the at least one pixel.

The light sensor can be enabled to detect patterns in the structured light pattern and the detection indication can comprise an indication of at least a portion of a detected pattern.

The light sensor can comprise one or more of a photodetector, a photodiode, a phototransistor, a charge coupled device, and a camera device.

Another aspect of the specification provides a projector system comprising a computing device; at least one projector enabled to communicate with the computing device; an apparatus comprising a light sensor, the apparatus enabled to transmit a request to the computing device to cause the projector to project a structured light pattern at a screen; and when at least one pixel in the structured light pattern projected by the projector is detected at the light sensor, when the light sensor is proximal the screen, transmit a detection indication to the computing device to communicate detection of the at least one pixel.

The structured light pattern can comprise a raster of pixels projectable by the projector. The raster ends when the associated indication is received at the computing device.

The structured light pattern can comprise a sequence of images which are dynamically adjusted to determine a position of the light sensor, the apparatus further enabled to transmit a respective detection indication to the projector system when at least one respective pixel is detected in one or more of the images. Projection of the sequence of images can end when the position of the light sensor is determined within a given margin of error.

The computing device can be enabled to align an edge of an image projected by the projector with about the at least one pixel.

The computing device can be enabled to determine a first position of the light sensor based on receiving the detection indication, the first position associated with an edge of an image projected by the projector; determine a second position of the light sensor based on receiving a subsequent detection indication from the apparatus when at least a second pixel in the structured light pattern is detected by the light sensor; and, move at last a portion of the edge of the image from the first position to the second position.

The projector system can further comprise at least a second projector enabled to project a second structured light pattern when the request is received at the computing device, the structured light pattern and the second structured light pattern projected in a given sequence, and the computing device can be enabled to: determine an overlap area between the structured light pattern and the second structured light pattern by determining respective positions of the light sensor relative to each of the structured light pattern and the second structured light pattern; and, blend together, in the overlap area, a first image projected by the projector and a second image projected by the second projector. The computing device can determine a plurality of relative positions of the light sensor for each of the structured light pattern and the second structured light pattern to define the overlap area, each of the plurality of relative positions determined when a respective request is received from the apparatus to cause the projector to project the structured light pattern and the second projector to project the second structured light pattern. Respective colour information can be received in each of the detection indication and the second detection indication, the respective colour information used by the computing device to blend colour of the first image and the second image.

The structured light pattern can comprise a pattern of features associated with given locations in the structured light pattern.

The structured light pattern can be projected in an infrared light spectrum, the light sensor can be enabled to detect infrared light, and the structured light pattern can be projected with an image in a human visible light spectrum.

The detection indication can be further indicative of selection of an item in an image projected onto the screen.

The projection system can further comprise a device for moving the apparatus relative to the screen.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
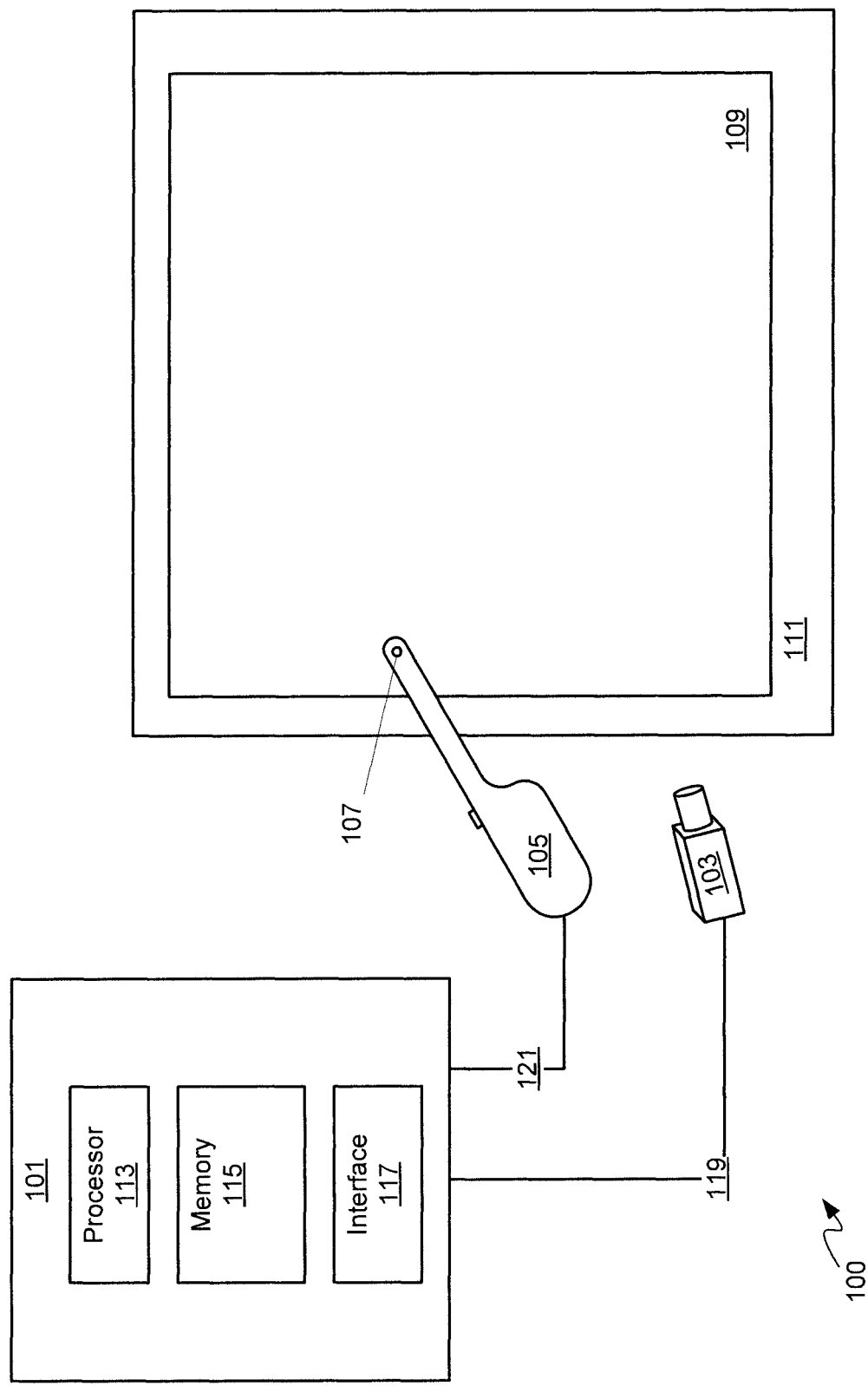
FIG. 1 depicts a system for determining locations in a projected image, according to non-limiting embodiments.

FIG. 1 depicts a system 100 for determining locations in a projected image, according to non-limiting implementations. System 100 comprises a computing device 101, at least one projector 103 enabled to communicate with computing device 101, and an apparatus 105 comprising a light sensor 107, apparatus 105 enabled to: transmit a request to computing device 101 to cause projector 103 to project a structured light pattern at a screen 111, for example in an area 109, which generally defines a projectable area of projector 103; and, when at least one pixel in the structured light pattern projected by projector 103 is detected at light sensor 107 when light sensor 107 is proximal screen 111, transmit a detection indication to computing device 101 to communicate detection of the at least one pixel. It is appreciated that the structured light pattern comprises one or more images projected at screen 111 by projector 103 such that light sensor 107 can detect one or more pixels therein to enable a determination of a location of the one or more pixels: for example, features and/or pixel locations in the one or more images can be associated with given locations in the one or more images. Implementations of the structured light pattern will be described below with reference to FIGS. 6, 10 and 11;

Computing device 101 comprises a processor 113, a memory 115 and a communication interface 117, interchangeably referred to hereafter as interface 117. Furthermore, computing device 101 is enabled for communication with projector 103 via a link 119. In general, computing device 101 comprises an image generator and/or an image source and can hence store images for projection at memory 115. Further, computing device 101 is enabled to control projector 103 to project images by transmitting image data and/or control data to projector 103 via link 119, which can be wired and/or wireless as desired.

Further, computing device 101 is enabled for communication with apparatus 105 via a link 121, which can also be wired and/or wireless as desired. However, in specific non-limiting implementations, apparatus 105 comprises a wireless device which communicates with computing device 101 wirelessly, and hence, in these implementations, link 121 is wireless.

Processor 113 can be implemented as a plurality of processors, including but not limited to one or more central processors (CPUs). Processor 113 is configured to communicate with memory 115, which can comprise a non-volatile storage unit (e.g. Erasable Electronic Programmable Read Only Memory ("EEPROM"), Flash Memory) and a volatile storage unit (e.g. random access memory ("RAM")). Further, in some implementations, at least a portion of memory 115 can be removable, and can include, but is not limited to, a flash drive. Programming instructions that implement the functional teachings of computing device 101 as described herein are typically maintained, persistently, in memory 115 and used by processor 113 which makes appropriate utilization of the volatile storage unit during the execution of such programming instructions. Those skilled in the art will now recognize that memory 115 is an example of computer readable media that can store programming instructions executable on processor 113. Furthermore, memory 115 is also an example of a memory unit and/or a memory module.

Processor 113 also connects to communication interface 117, referred to hereafter as interface 117, which can be implemented as one or more radios configured to communicate with projector 103 and apparatus 105, and optionally one or more communication networks. In general, it will be appreciated that interface 117 is configured to correspond with network architecture that is used to implement links 119, 121, and any links to communication networks, including but not limited to any suitable combination of USB (universal serial bus) cables, serial cables, wireless links, cell-phone links, cellular network links (including but not limited to 2G, 2.5G, 3G, 4G+, and the like), Bluetooth links, NFC (near field communication) links, WiFi links, WiMax packet based links, the Internet, analog networks, the PSTN (public switched telephone network), access points, and the like, and/or a combination. Interface 117 can also be used to communicate with an external memory for storage of image data.

In some implementations, computing device projector 103; in other words, computing device 101 and projector 103 can be combined into a single projection device. Indeed, it is appreciated that computing device 101 and projector are each elements of a projector system that can operate independent of apparatus 105.

Computing device 101 comprises any suitable computing device for communicating with projector 103 and apparatus 105; hence, computing device one or more of a personal computer, an image generator, a storage device for storing cinema files, video files, display files, projector files, a video game system, a simulation system, a visualization system, a training system, a cinema system and the like.

Figure 2:
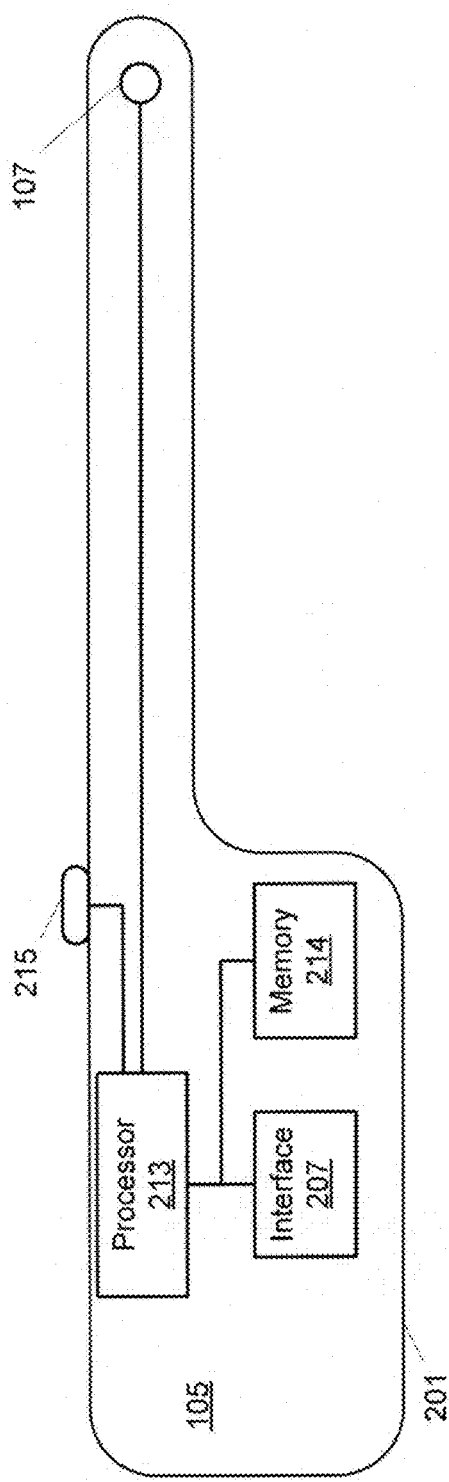
FIG. 2 depicts a schematic diagram of an apparatus for determining locations in a projected image, according to non-limiting embodiments.

With reference to FIG. 2, apparatus 105 comprises light sensor 107, a body 201 comprising light sensor 107, body 201 enabled to position light sensor 107 proximal to screen 111 to detect light from projector 103. Indeed, it is appreciated that light sensor 107 and apparatus 105 are enabled to detect light from projector 103 rather than to detect light reflected from screen 111. For example, apparatus 105 is generally enabled to be placed proximal screen 111 with light sensor 107 facing projector 103 to detect light there from.

Apparatus 105 further comprises a communication interface 207 (interchangeably referred to hereafter as interface 207) for communicating with a projector system including but not limited to computing device 101 and projector 103. Interface 207 is generally compatible with the architecture of link 121 and is enabled to communicate with interface 117 of computing device 101. In implementations where apparatus 105 communicates wirelessly with computing device 101, interface 207 comprises one or more radios. Interface 207 can hence be similar to interface 117 described above.

Apparatus 105 further comprises a processor 213 interconnected with light sensor 107 and interface 207, processor 213 enabled to: transmit a request to computing device 101 to cause projector 103 to project structured light pattern; and when at least one pixel in structured light pattern projected by projector 103 is detected at light sensor 107, transmit a detection indication to computing device 101 to communicate detection of the at least one pixel. Processor 213 can be implemented as a plurality of processors, including but not limited to one or more central processors (CPUs).

Apparatus 105 further comprises a memory 214; processor 213 is configured to communicate with memory 214, which can comprise a non-volatile storage unit (e.g. Erasable Electronic Programmable Read Only Memory ("EEPROM"), Flash Memory) and a volatile storage unit (e.g. random access memory ("RAM")). Further, in some implementations, at least a portion of memory 214 can be removable, and can include, but is not limited to, a flash drive. Programming instructions that implement the functional teachings of apparatus 105 as described herein are typically maintained, persistently, in memory 214 and used by processor 213 which makes appropriate utilization of the volatile storage unit during the execution of such programming instructions. Those skilled in the art will now recognize that memory 214 is an example of computer readable media that can store programming instructions executable on processor 213. Furthermore, memory 214 is also an example of a memory unit and/or a memory module.

Apparatus 105 further comprises at least one button 215, or the like (i.e. any other suitable input device is within the scope of present implementations), interconnected with processor 213, wherein processor 213 is further enabled to transmit the request when button 215 is actuated, as described in further detail below.

It is appreciated that, in some implementations, body 201 is enabled to be hand-held, such that user can position apparatus 105, and specifically light sensor 107, proximal to screen 111 facing projector 103. In yet further implementations, apparatus 105 can further comprise a telescoping accessory for extending body 201, for example when areas of screen 111 are out of reach of the user; hence body 201 can be extended using the telescoping accessory so that the user can position apparatus, and specifically light sensor 107, at areas of screen 111 out of reach of the user.

In yet further implementations, body 201 is enabled for mounting on a device for moving apparatus 105 around screen 111, including, but not limited to, one or more of a crane and a scissor lift.

In some implementations, the structured light pattern can be projected in a human visible light spectrum; for example the structured light pattern can comprise one or more wavelengths in a range of about 390 nm to about 750 nm. Alternatively, the structured light pattern can be projected in an infrared light spectrum; for example the structured light pattern can comprise one or more wavelengths in a range of about 740 nm to about 300000 nm. In yet further implementations, the structured light pattern can be projected in one or more of a human visible light spectrum and an infrared light spectrum. In any event, light sensor 107 is generally enabled to detect light in the structured light pattern; as such, light sensor 107 is generally enabled to detect one or more of light in a human visible spectrum, and infrared light. In yet further implementations, ultraviolet light could be used in place of infrared light. In yet further implementations, the structured light pattern can comprise a primary colour to eliminate convergence as a source of confusion for pixel location.

Light sensor 107 can comprise any suitable light sensor, including, but not limited to, a photodetector, a photodiode, a phototransistor, a charge coupled device, a camera device, and the like.

In yet further implementations, light sensor 107 is enabled to detect colour and the detection indication comprises a colour indication of the at least one pixel.

Returning to FIG. 1, projector 103 comprises a projector for projecting images, including but not limited to the structured light pattern. Projector 103 can include, but is not limited to a digital projector, a cinema projector, an LCD (liquid crystal display) based projector, an LCOS (Liquid Crystal on Silicon) based projector, a DMD (digital multimirror device) based projector, a DLP (Digital Light Processing) based projector and the like. In general, it is appreciated that projector 103 has a given resolution of given number of pixels, and can project images using all of the pixels or subset of the pixels.

Screen 111 comprises any suitable screen upon which an image can be projected by projector 103. While screen 111 is depicted as rectangular and flat in FIG. 1, it is appreciated that screen 111 can be any suitable shape and/or complex geometry, including, but not limited to curved and the like. It is further appreciated that screen 111 and projector 103 are positioned such that projector 103 can project images on screen 111 within area 109. Indeed, it is yet further appreciated that area 109 represents the maximum area over which projector 103 can project an image. In other words, in FIG. 1, the maximum size of an image that projector 103 can project onto screen 111 is area 109 when all pixels available to projector 103 are projected; however, projector 103 can project an image smaller than area 109, but then projector 103 uses only a subset of available pixels.

Figure 3:
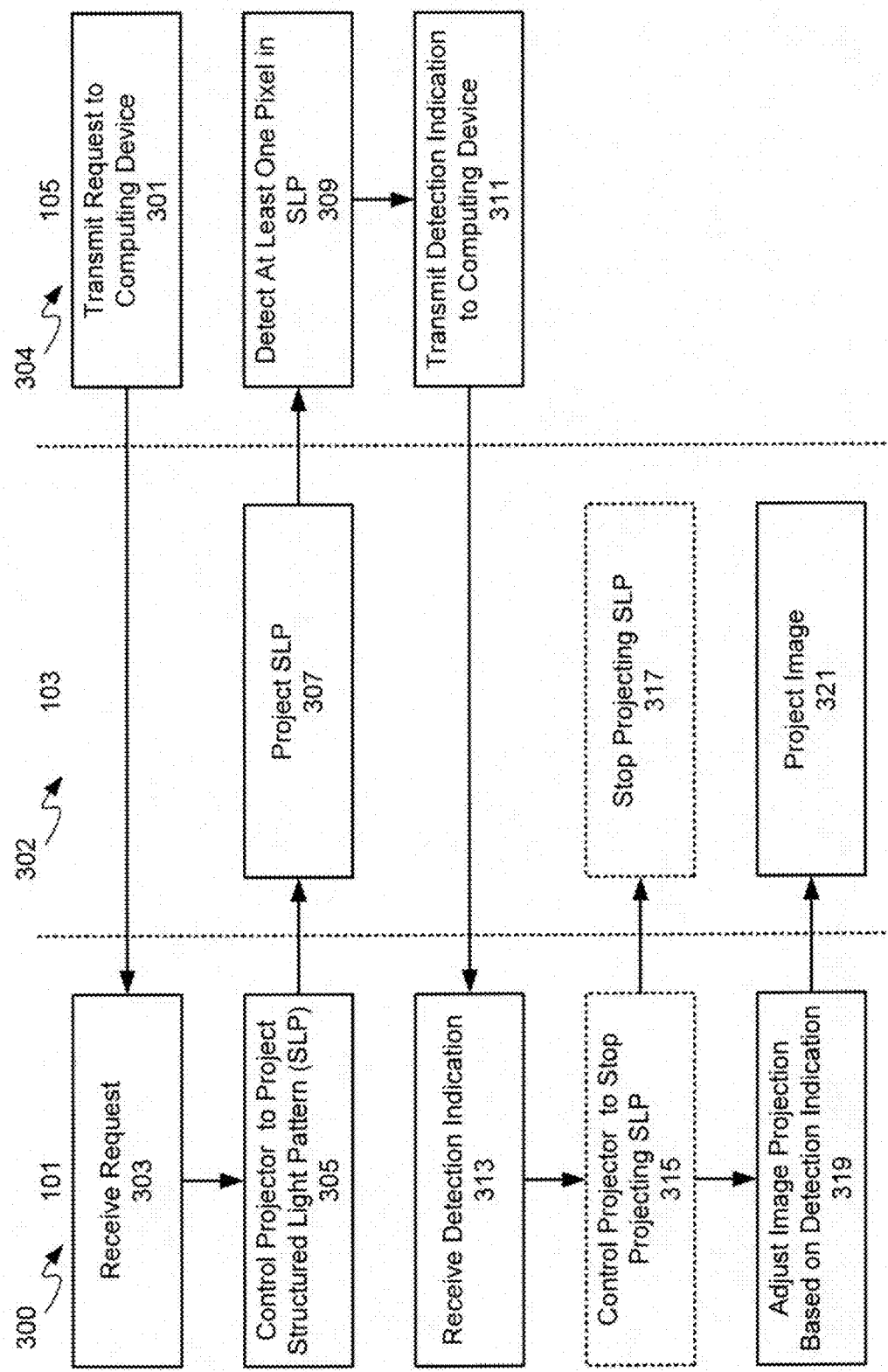
FIG. 3 depicts a flowchart of a method for determining locations in a projected image, according to non-limiting embodiments.

Attention is now directed to FIG. 3 which depicts a flowchart illustrating methods 300, 302, 304 for determining locations in a projected image, according to non-limiting implementations. In order to assist in the explanation of methods 300, 302, 304, it will be assumed that methods 300, 302, 304 are performed using system 100. Furthermore, the following discussion of methods 300, 302, 304 will lead to a further understanding of system 100 and its various components. However, it is to be understood that system 100 and/or methods 300, 302, 304 can be varied, and need not work exactly as discussed herein in conjunction with each other, and that such variations are within the scope of present implementations. It is further appreciated that method 300 is performed by processor 113 of computing device 101, method 302 is performed by projector 103, and method 304 is performed by processor 213 of apparatus 105.

It is to be emphasized, however, that methods 300, 302, 304 need not be performed in the exact sequence as shown, unless otherwise indicated; and likewise various blocks may be performed in parallel rather than in sequence; hence the elements of methods 300, 302, 304 are referred to herein as "blocks" rather than "steps". It is also to be understood that method 300, 302, 304 can be implemented on variations of system 100 as well.

At block 301, apparatus 105 transmits a request to computing device 101 to project a structured light pattern using projector 103 (e.g. apparatus 105 transmits a request to a projector system). It is assumed that apparatus 105 has been positioned in area 109 and hence at least one pixel of the structured light pattern can be detected at light sensor 107. The request can be transmitted when button 215 is actuated. At block 303, computing device 101 receives the request. At block 305, computing device 101 controls projector 103 to project the structured light pattern, for example within area 109. At block 307, projector 103 projects the structured light pattern for example at screen 111. At block 309, at least one pixel in the structured light pattern projected by projector 103 is detected at light sensor 107.

At block 311, in response to light sensor 107 detecting at least one pixel in the structured light pattern, apparatus 105 transmit a detection indication to computing device 101 (e.g. the projector system) to communicate detection of the at least one pixel, and the detection indication is received at computing device 101 at block 313.

It is appreciated that blocks 305 to 313 can be repeated until apparatus 105 detects at least one pixel in the structured light pattern with a given margin of error. For example, as discussed below with reference to FIG. 10, the structured light pattern can comprise a series of images that are dynamically updated whenever a detection indication is received at computing device 101 from apparatus 105; for example, in these implementations, successive images in the structured light pattern generally get smaller and smaller until one of the images is on the order of a few pixels or less, which is then detected by light sensor 107.

In any event, when computing device 101 receives the associated detection indication, blocks 315 occurs, as computing device 101 has hence identified at least one pixel associated with a location of light sensor 107 within a given margin of error (i.e. on the order of a few pixels).

In some implementations, at an, optional block 315, as indicated by stippled lines in FIG. 3, computing device 101 controls projector 103 to stop projecting the structured light pattern, and hence at optional block 317 (as indicated by stippled lines in FIG. 3) projector stops projecting the structured light pattern. However, in other implementations, projector 103 projects the entire structured light pattern even after computing device 101 receives the detection indication.

Either way, at block 319, computing device 101 adjusts image projection by projector 103 based on the detection indication received at block 313. For example, in some implementations, the at least one pixel identified by blocks 305 to 313 is set as an edge of an image projected by projector 103; in other words, apparatus 105 can be used to identify where an edge of an image projected by projector 103 is to be located.

Hence, a user can hold apparatus 105 to screen 111, with light sensor 107 facing projector 103, the light sensor 107 positioned at a desired edge of images to be projected, button 215 can be actuated hence causing the structured light pattern to be projected thus identifying one or more pixels located at a location of the light sensor 107. An image projected by projector 103 can be adjusted to include the one or more pixels at the edge. In some of these implementations, one or more pixels in a line can be identified in a similar manner and the edge of the projected image can be adjusted to include the identified pixels in the line.

Figure 4:
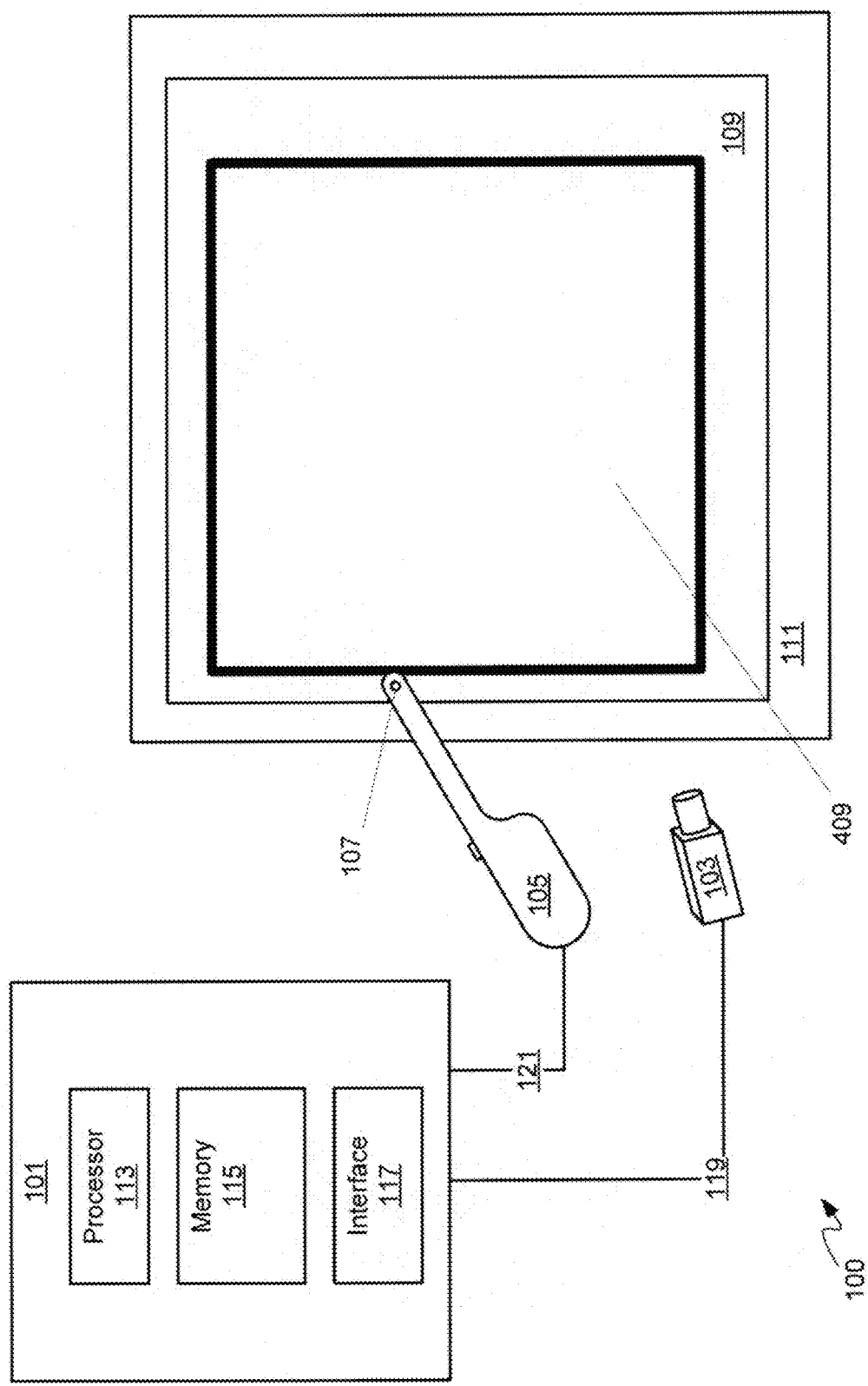
FIG. 4 depicts the system of FIG. 1 with an image being projected onto a screen, according to non-limiting embodiments.
Figure 5:
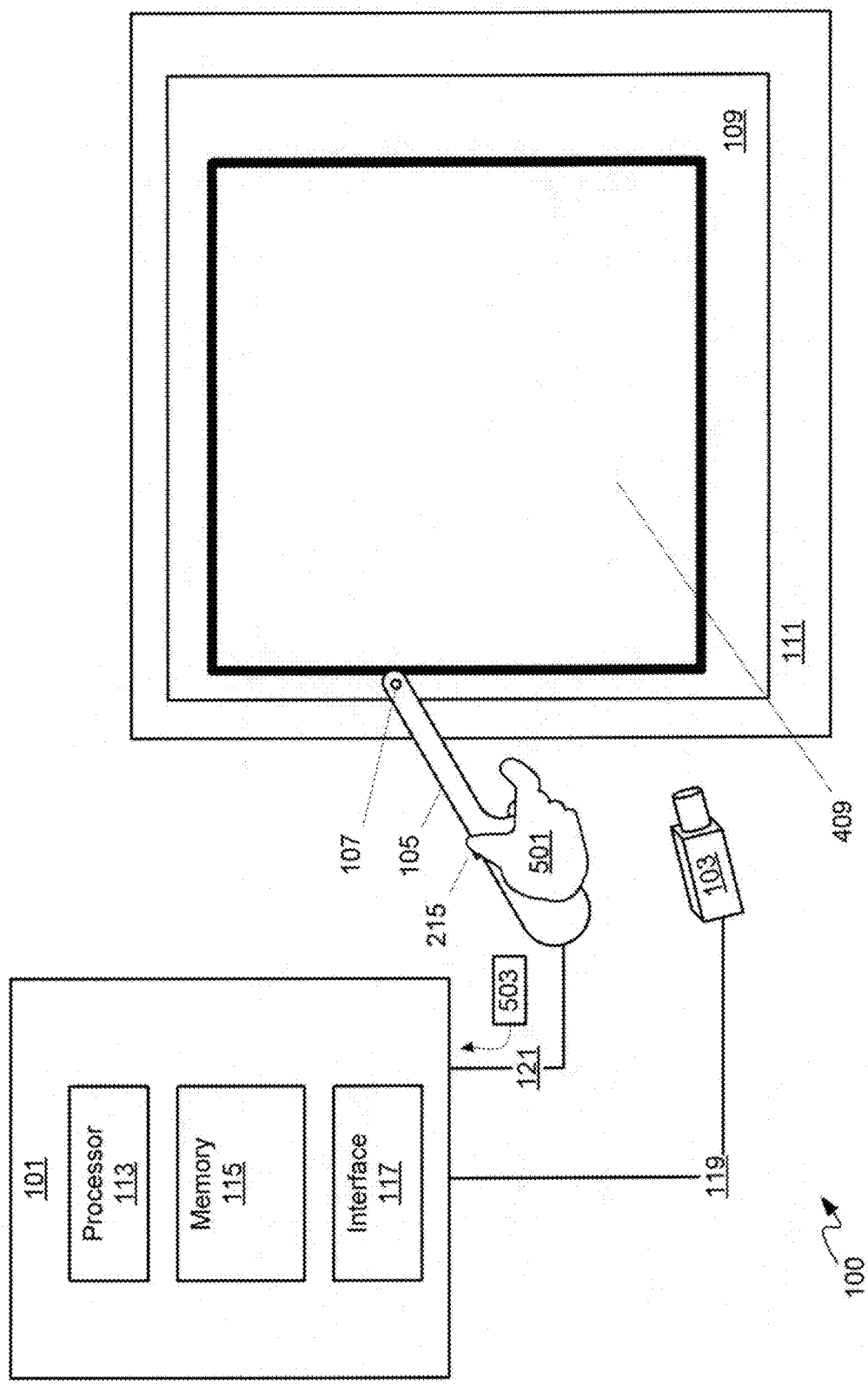
FIG. 5 depicts the system of FIG. 4 with a light sensor of the apparatus of FIG. 2 positioned at a desired location of an edge of the projected image, according to non-limiting embodiments.
Figure 6:
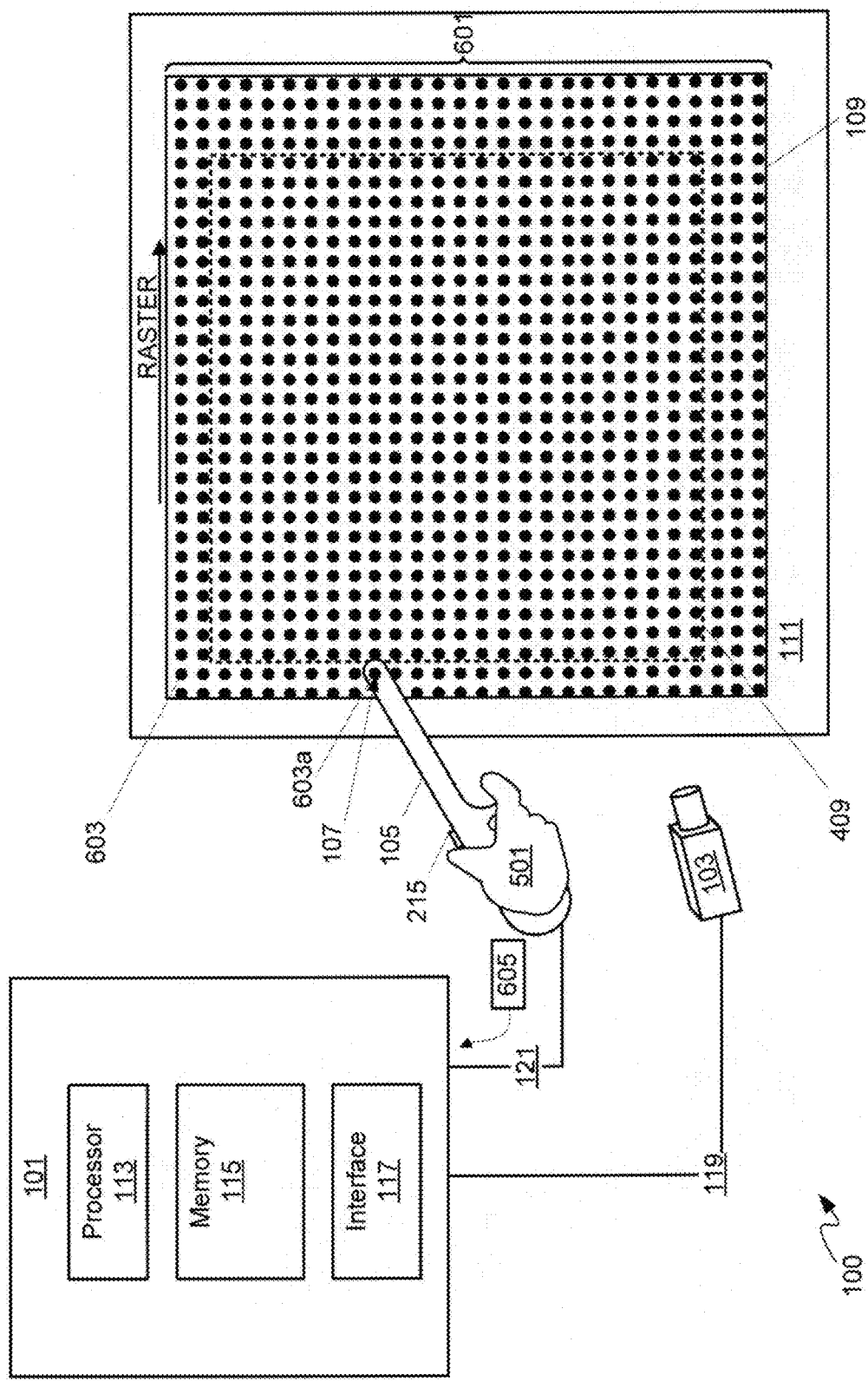
FIG. 6 depicts the system of FIG. 5 with a structured light pattern being projected onto the screen, according to non-limiting embodiments.

Attention is next directed to FIGS. 4 to 6 each of which is substantially similar to FIG. 1, with like elements having like numbers. FIGS. 4 to 6 depict a sequence for determining locations in a projected image according to methods 300, 302, 304 in system 100. FIG. 4 depicts an initial state of system 100 with projector 103 projecting an image 409 onto screen 111 within area 109, with image 409 having an area less than area 109. In other words, in FIG. 4, projector 1.03 is projecting image 409 onto screen 111 but uses only a subset of the available pixels; for example, it is appreciated that projector 103 is capable of expanding projection of image 409 to the edges of area 109.

In any event, in FIG. 5, light sensor 107 of apparatus 105 is placed at an edge of image 409: a user, as represented by hand 501, positions light sensor 107 at an edge of image 409, and actuates button 215. Actuation of button 215 causes apparatus 105 (and specifically processor 213) to transmit a request 503 (block 301,) to computing device 101 to project a structured light pattern using projector 103. Upon receiving (block 303) and processing request 503, computing device 101 controls projector 103 (block 305) to project the structured light pattern (block 307), which is generally projected in area 109, i.e. in the maximum area projectable by projector 103. A non-limiting example of a structured light pattern 601 is depicted in FIG. 6, described below.

It is appreciated that the structured light pattern need not comprise all of area 109, however, but can comprise a portion thereof. It is further appreciated that the structured light pattern is not specifically a static pattern but can comprise a dynamic light pattern, for example a sequence of images. In the depicted non-limiting example of FIG. 6; structured light pattern 601 comprises a raster of pixels 603 projected by projector 103, only two of which are labelled in FIG. 6 for clarity (i.e. pixels 603, 603a). For example, projector 103 projects a plurality of projected pixels 603 in a raster pattern, one after the other and row by row, turning each pixel 603 on and then off in a sequence. While the depicted rastering is row by row and one after the other, in other implementations, pixels 603 can be rastered in any suitable sequence and/or turned on and off in any suitable sequence exclusive of rastering (e.g. a suitable sequence does not need to proceed row by row and/or column by column and hence need not be rastered).

When light sensor 107 detects (block 309) one or more of pixels 603, apparatus 105 transmits (block 311) a detection indication 605 to computing device 101, which indicates to computing device 101 that apparatus 105 has detected at least one given pixel 603, for example the pixel 603a that is aligned with light sensor 107 in FIG. 6. Hence, computing device 101 can determine that light sensor 107 is located proximal to the at least one given pixel 603a. As depicted, once detection indication 605 is received at computing device 101, the rest of structured light pattern 601 is projected. However, in other implementations, once detection indication 605 is received at computing device 101 (block 313), computing device 101 causes the raster to end (blocks 315, 317), for example see FIG. 13, described below.

In other words, computing device 101 has determined a location of light sensor 107 within structured light pattern 601 as indicated by detected pixel 603a. It is assumed that the speed of the raster and the time between light sensor 107 detecting pixel 603a and computing device 101 receiving detection indication 605 are commensurate with each other. In other words, detection indication 605 is generally received at computing device 101 within a given period of time after pixel 603a is projected. Hence, once a given pixel 603 is projected, a next pixel 603 in the raster is not projected until a given period of time has passed that is about the about equal to or greater than a time it would take between light sensor 107 detecting a pixel 603 and computing device 101 receiving an associated detection indication 605.

In any event, detection indication 605 is received at computing device 101, and computing device 101 adjusts image projection of projector 103 based on the detection indication (block 319). For example, computing device 101 can store an indication of the detected pixel 603a, for example at memory 115, and further align an edge of image 409 projected by projector 103 with the at least one pixel 603a.

Figure 7:
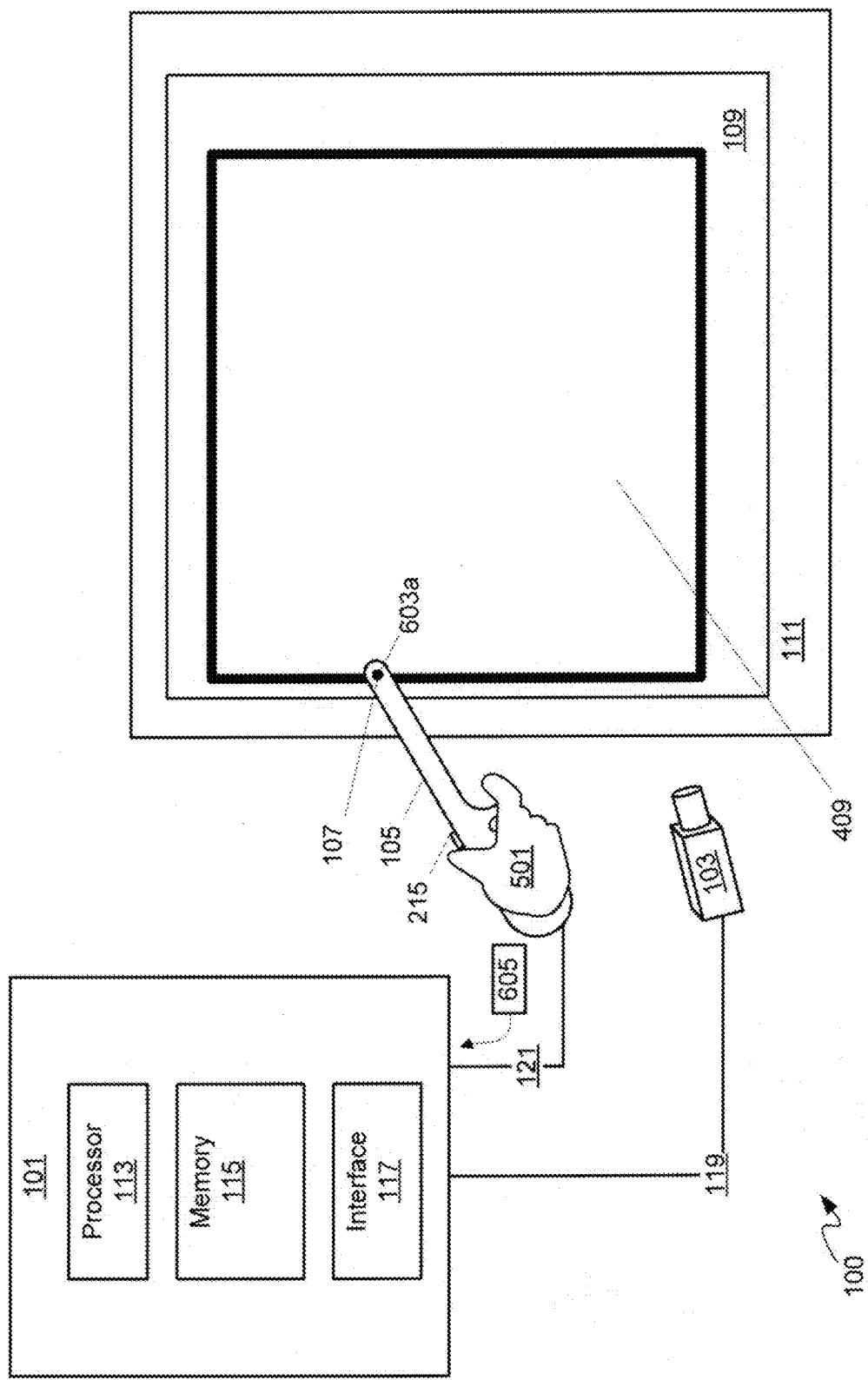
FIG. 7 depicts the system of FIG. 5, with the edge of the projected image moved to a location of the light sensor, according to non-limiting embodiments.

For example, when image 409 is next projected (block 321), as in FIG. 7 computing device 101 will control projector 103 to include the at least one detected pixel 603a at an edge of image 409. Computing device 101 can further adjust image 409 to take into account the new geometry, for example, warping image 409 to match the geometry of screen 111.

It is appreciated that the sequence depicted in FIGS. 4 to 7 can be repeated for many pixels in the structured light pattern so that by repeatedly actuating button 215 and hence repeatedly storing positions of pixels in the structured light pattern, an edge of an image can be defined.

For example, system 100 can be placed in an image-edge-definition mode, where it is understood that positions for a plurality of pixels in a structured light pattern are to be determined and stored: for example, apparatus 105 can he used to place system 100 into, such a mode via an actuation sequence at button 215 (for example, a long press, or the like); alternatively, system 100 can be placed in such a mode via receipt of input data at one of computing device 101 and projector 103.

In yet further implementations, system 100 can be placed into a define-corner mode, where it is understood that four detection indications will be received from apparatus 105 at computing device 101, similar to detection indication 605, one for each corner of an image to be projected by projector 103. The corresponding pixel locations are stored by computing device 101 and when, for example, image 409 is next projected, the four corners of image 409 are changed to the four stored corners.

It is further appreciated that size of pixels 603 has been exaggerated in FIG. 6 for clarity, as has spacing of pixels 603. For example, the size of projected pixels 603 can be smaller than size of light sensor 107, and further the spacing of projected pixels 603 can be closer together than depicted, such that it is unlikely that light sensor 107 can be located between pixels 603 which would result in no pixels 603 being detected by light sensor 107. In other words, light sensor 107 is large enough to detect at least one pixel 603 relative to both sizes of pixels 603 and spacing of pixels 603.

It is yet further appreciated that image 409 and structured light pattern 601 can be projected by projector 103: for example, structured light pattern 601 can be interleaved with image 409, presuming that sensing of pixels 603 is coordinated with light sensor 107. In other words, when image 409 and structured light pattern 601 are projected by interleaving structured light pattern images with image 409, light sensor 107 can also detect light from image 409. Hence, in these implementations, detection indications received from apparatus 105 due to image 409 are, ignored by computing device 101, for example, via computing device 101 timing the arrival of detection indications compared to when a image 409 or structured light pattern 601 is projected. Alternatively, computing device 101 can control apparatus 105 to disable light sensor 107 when image 409 is being projected by transmitting a coordinating signal to apparatus 105 via link 121.

In yet further implementations, image 409 and structured light pattern 601 can be projected in different wavelength ranges. For example, image 409 can be projected in a human visible light spectrum, as described above, and structured light pattern 601 can be projected in an infrared light spectrum (by projector 103 and/or another projector, not depicted); in these implementations, light sensor 107 is enabled to detect light in the infrared light spectrum corresponding to structured light pattern 601. Hence, in these implementations, image 409 and structured light pattern 601 can be co-projected.

It is further appreciated that, while optional, co-projection of image 409 with structured light pattern 601 is indicated by the stippled line in FIG. 6.

In any event, in implementations where image 409 and structured light pattern 601 are co-projected, to a user, image 409 appears to change from the area depicted in FIG. 3 to the area depicted in FIG. 7 as a result of locating light sensor 107 at a desired position of the edge of image 409 and actuating button 215.

Figure 8:
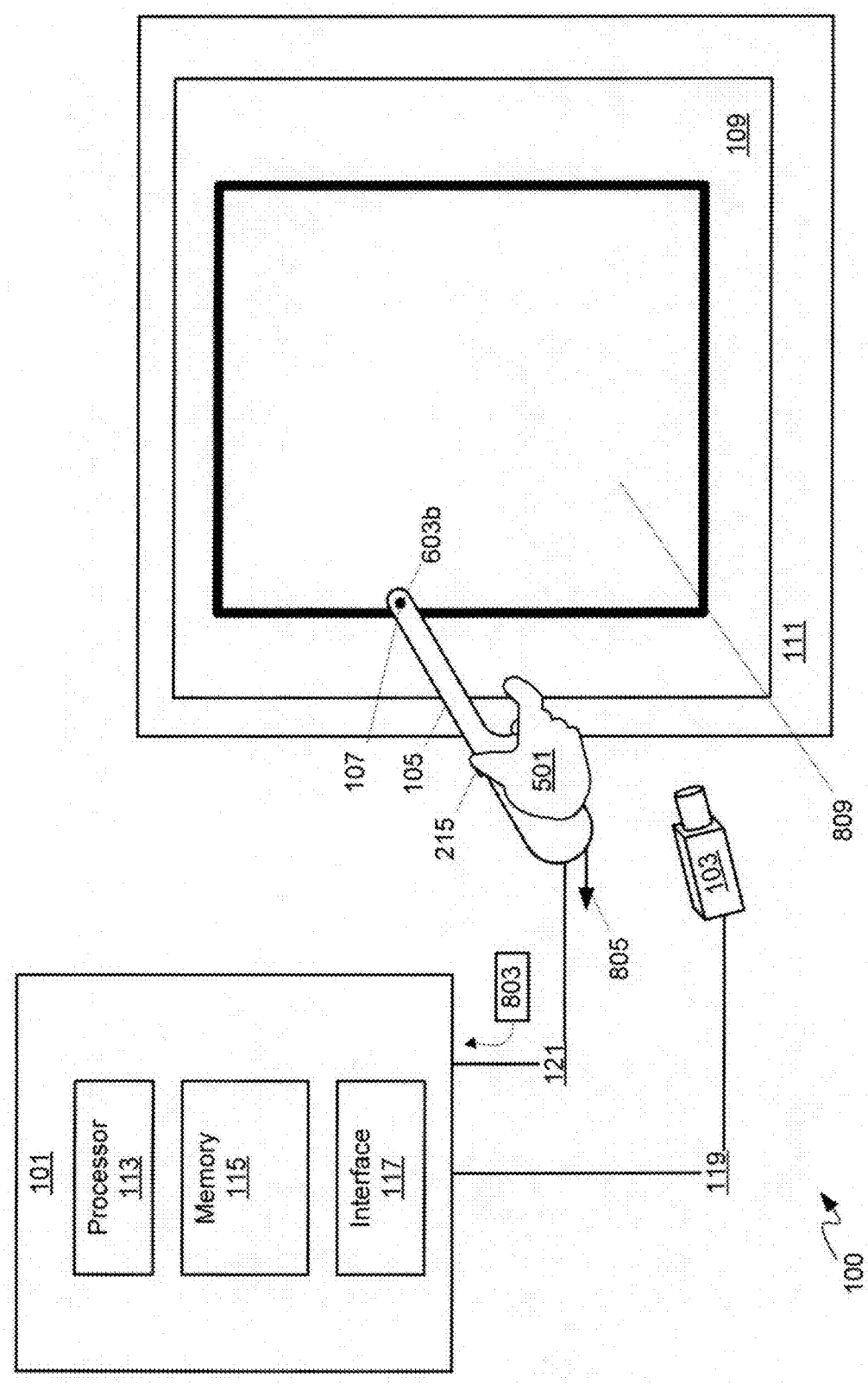
FIG. 8 depicts the system of FIG. 1 with an image being projected onto a screen, and a light sensor of the apparatus of FIG. 2 positioned at an edge thereof, according to non-limiting embodiments.
Figure 9:
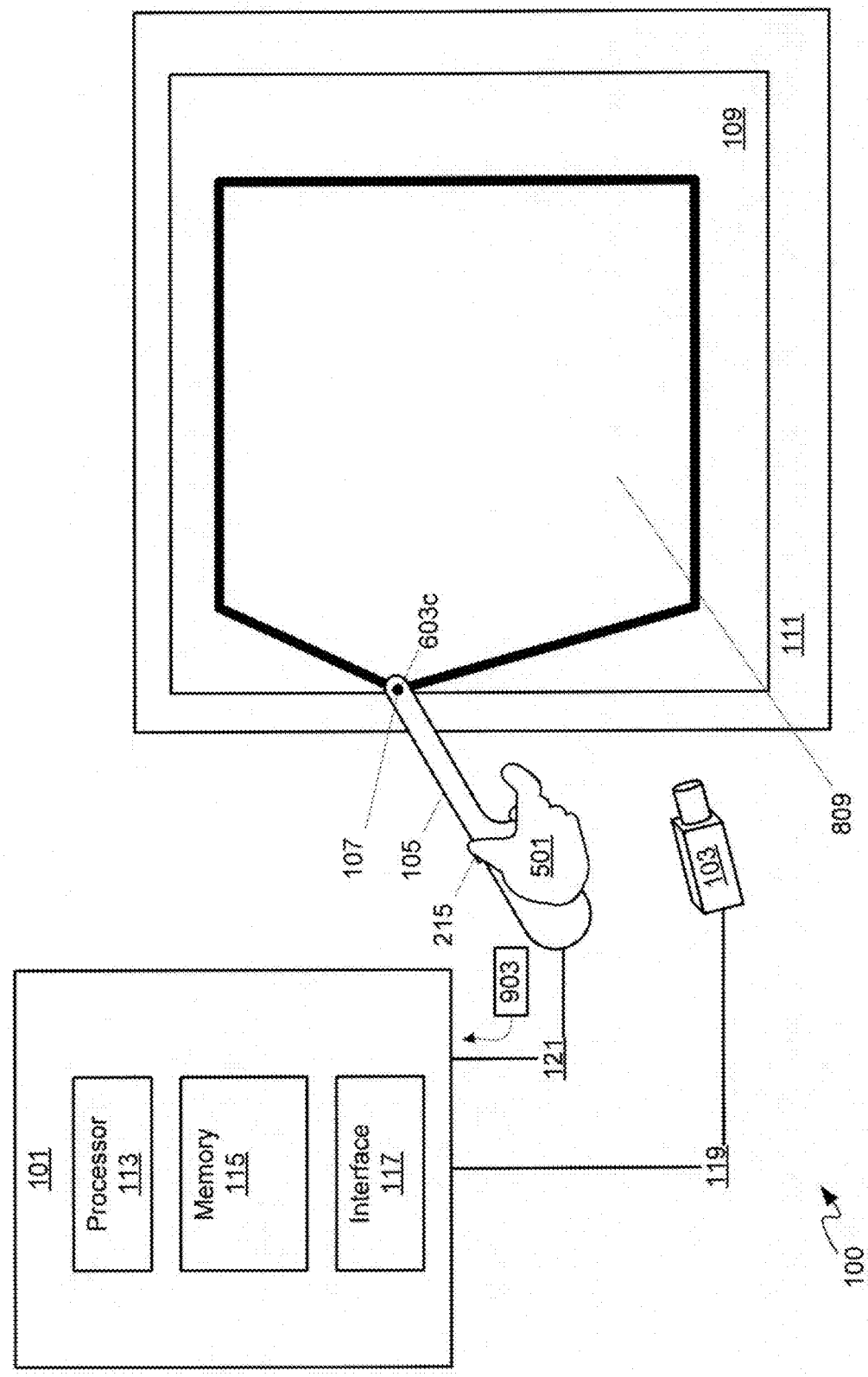
FIG. 9 depicts the system of FIG. 8 with at least a portion of the edge of the projected image dragged to a new location using the apparatus of FIG. 2, according to non-limiting embodiments.

Attention is next directed to FIGS. 8 and 9 each of which are substantially similar to FIG. 6 with like elements having like numbers, however an image 809 is being projected, similar to image 409, but smaller. It is further assumed in FIG. 8 that: blocks 303 to 309 of methods 300, 302, 304 have occurred; that image 809 and structured light pattern 601 are being projected in any suitable manner; and that sensor 107 of apparatus 105 has been placed at an edge of image 809, such that a pixel 603b of structured light pattern 601 is detected by light sensor 107 and detection indication 803 is transmitted to computing device 101, similar to detection indication 605. It is further appreciated that, in FIG. 8, only pixel 603b of structured light pattern 601 is depicted for clarity.

Hence, in FIG. 8, computing device 101 has determined a first position of light sensor 107 based on receiving detection indication 803, the first position associated with an edge of image 809 projected by projector 103.

It is further assumed that apparatus 105 is then moved towards an edge of area 109 (in the direction of arrow 805) such that apparatus is then in the position depicted in FIG. 9, where blocks 301 to 313 again occur such that computing device 101 determines a second position of light sensor 107 based on receiving a subsequent detection indication 903 from the apparatus when at least a second pixel 603c in structured light pattern 601 is detected by light sensor 107. Computing device 101 then moves at least a portion of an edge of image 809 that included pixel 603b, from the first position to the second position.

Hence, in FIG. 9, apparatus 105 has been subsequently moved towards an edge of area 109, button 215 has been actuated again causing a second request (similar to request 503) to be transmitted to computing device 101 to again cause the structured light pattern to be projected by projector 103, including rastering of pixels 603, as described above. It is appreciated that pixels 603 are rastered again as in FIG. 6, for example until pixel 603c is detected by light sensor 107.

Alternatively, user places light sensor 107 at an edge of image 809, as depicted in FIG. 8, actuates button 215, and drags light sensor 107 towards an edge of area 109. Computing device 101 then stores a first position of light sensor 107 as a location of pixel 603b. Computing device 101 and projector 103 continue to project structured light pattern 601 such that each time a new detection indication is received at computing device 101, computing device determines an updated position of light sensor 107 as a location of a detected pixel in structured light pattern 601 and subsequently updated image 809. In some implementations, a user can place light sensor 107 and an edge of image 809 that is to be moved, actuate and hold button 215, and "drag" the edge of image 809 to a desired location, letting go of button 215 when the desired shape of image 809 is achieved, and/or until an edge of area 109 is reached. Hence, edges and/or portions of edges of image 809 can be dragged to the actual geometry of screen 111 and/or at least the edges of the available area 109. In yet further implementations, structured light pattern 601 can be projected when button 215 is actuated and then again when button 215 is released to detect a new position of light sensor 107.

While structured light pattern 601 has been described with respect to rastering of single pixels, in yet further implementations, a structured light pattern can comprise rastering of groups of pixels. For example rather than raster single pixels, groups of 10 pixels could be rastered to reduce the rastering time. Further the pixel grouping for rastering can be of any suitable size, and can further be on the order of about a size of light sensor 107.

Figure 10:
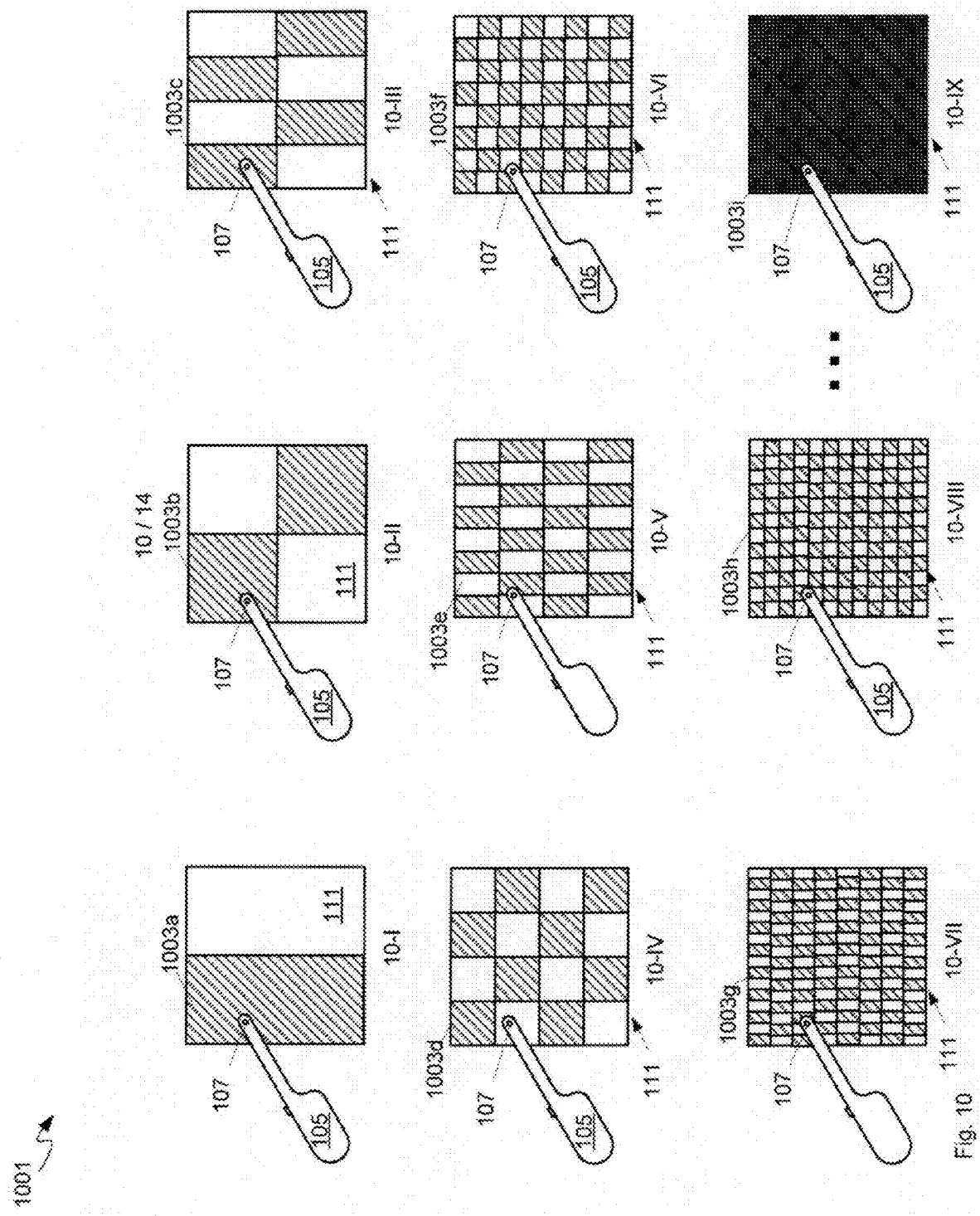
FIG. 10 depicts a structured light pattern comprising a series of dynamically updated images, according to non-limiting embodiments.
Figure 11:
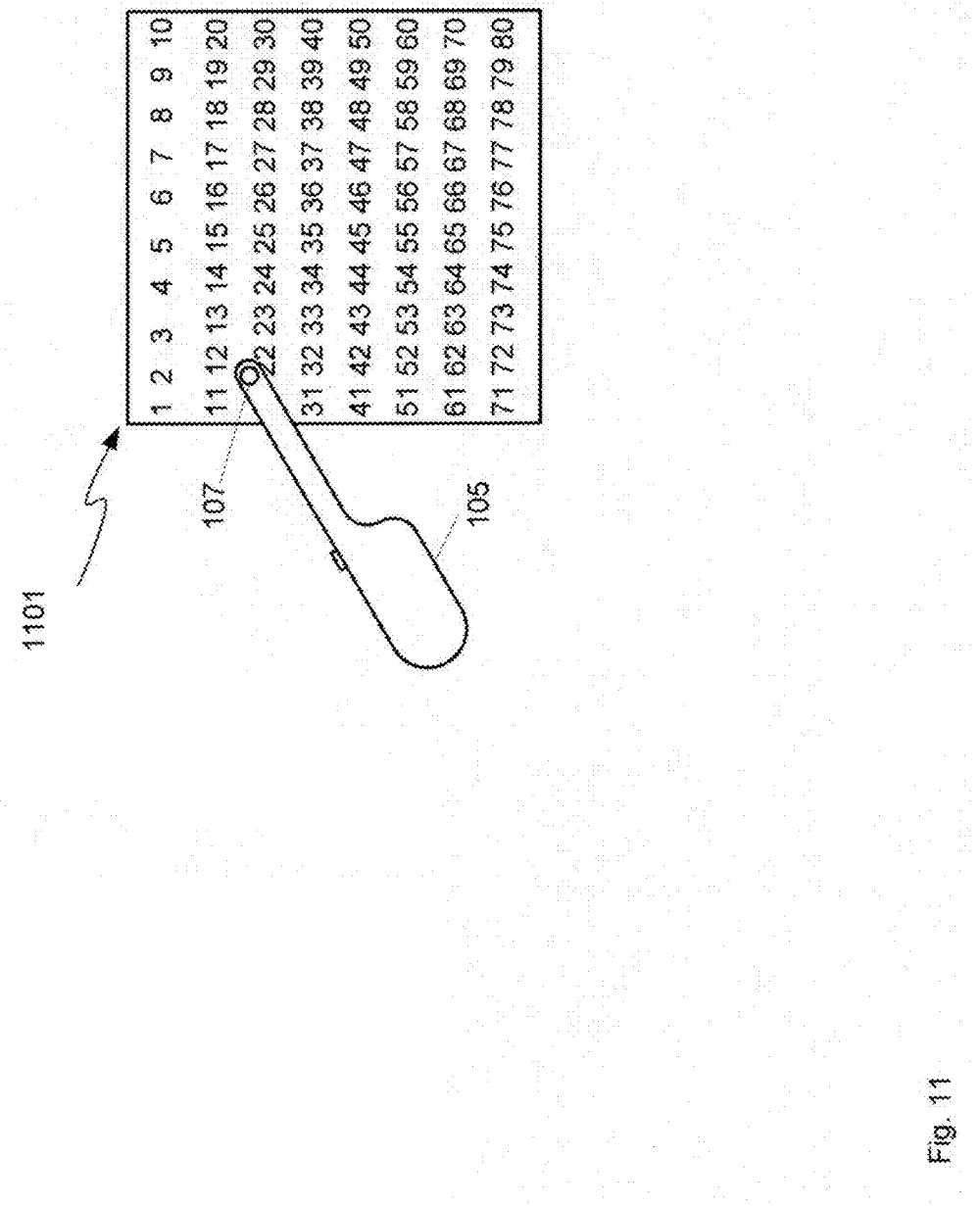
FIG. 11 depicts a structured light pattern comprising a given pattern of numbers, according to non-limiting embodiments.

It is further appreciated that any structured light pattern is within the scope of present implementations and structured light patterns are not limited to pixel rastering and/or sequential projection of pixels. For example, attention is next directed to FIG. 10 which depicts a structured light pattern 1001 comprising a series of images 1003a, 1003b, 1003c, 1003d, 1003e, 1003f, 1003g, 1003h, 1003i each comprising an alternating checkerboard pattern of increasing resolution. Images 1003a, 1003b, 1003c, 1003d, 1003e, 1003f, are referred to hereafter collectively as images 1003 and generically as an image 1003. Specifically, FIG. 10 depicts images 1003 as projected onto screen 111, in a sequence 10-I, 10-II, 10-III, 10-IV, 10-V, 10-VI, 10-VII, 10-VIII, 10-IX, with apparatus 105 placed between screen 111 and projector 103 (not depicted) such that apparatus 105 can detect light from projector 103 via light sensor 107. While FIG. 10 depicts images 1003 extending to an edge of screen 111 it is appreciated that images 1003 can extend only to an edge of the maximum area projectable by projector 103, such as area 109.

In any event, in these implementations, the resolution of an alternating checkerboard pattern is increased in successive images 1003 in structured light pattern 1001. Further, as each image 1003 is projected, light sensor 107 detects whether light is projected or not projected at the position of light sensor 107. An associated detection indication can be transmitted for each image 1003 or, alternatively, apparatus 105 can store (e.g. at memory 214) an associated detection indication for each image 1003 in the sequence (e.g. as a series of "1's" and "0's") and transmit the sequence to computing device 101 when structured light pattern 1001 is complete. The sequence can be transmitted when requested by computing device 101 via, link 121 or alternatively apparatus 105 can determine when structured light pattern 1001 is complete and transmit the sequence thereafter. Apparatus 105 can determine when structured light pattern 1001 is complete by determining that no changes have occurred at light sensor 107 for a given period of time and/or by determining that a given period of time has passed since button 215 was actuated: in other words, apparatus 105 is stores data indicative of the given period of time (e.g. at memory 214) which has been pre-determined to be at least the given period of time for projecting structured light pattern 1001, and collects data for that given time period.

In any event, each of images 1003 in structured light pattern 1001 comprises an alternating checkerboard pattern of increasing resolution. In the non-limiting example of FIG. 10, tight sensor 107 of apparatus 105 has been located in an upper left quadrant of screen 111. At 10-I, first image 1003a is projected and comprises a rectangle projected on a left half of screen 111, and hence the rectangle on the right hand side indicated an absence of light. As light sensor 107 is located on the left hand side of screen 111 light sensor 107 detects light. Hence, it can be determined that light sensor 107 is located at left hand side of screen 111. If light sensor 107 was located on a right hand side of screen 111, and no light had been detected, it could have been determined that light sensor 107 was located on the right hand side of screen 111. In other words, by coordinating the geometry of the projected image 1003a and with detection of no detection of light at light sensor 107, computing device 101 can determine a general location of light sensor 107 to within the resolution of image 1003a.

Furthermore, in some implementations, once light is detected or not at image 1003a, apparatus 105 can either transmit a detection indication or store the detection indication at memory 214 until the sequence is complete. For example, in depicted example implementations, the detection indication can comprise "1" as light was detected.

In a next projected image 1003b, the rectangles of image 1003a (both the light and dark rectangles) are divided into two horizontally to form squares such that image 1003b comprises a square projected into each of top left and bottom right quadrants of screen 111, and light from the top left square is detected by light sensor 107, hence it can be determined that light sensor 107 is located in the upper left quadrant. A detection indication of "1" can again be transmitted and/or stored.

In projected image 1003c, the squares of 1003b are divided into two vertically, such that the checkerboard of image 1003c is a checkerboard of rectangles rather than squares. It can hence be determined whether light sensor 107 is located on the left hand side or the right hand side of the upper left quadrant; as light is detected due to a rectangle being projected on the upper left side of the upper left quadrant, the detection indication is again "1" and it can be determined that light sensor 107 is located on the left hand side of the upper left quadrant.

At projected image 1003d, the rectangles of image 1003c (both the light and dark rectangles) are divided into two horizontally to form squares such that image 1003d comprises as checkerboard of squares. Hence, the left hand side of the upper left quadrant of screen has a square projected in the upper half and a square of no light in the lower half. As the light sensor 107 is located in the lower half, the detection indication comprises "0" and it can be determined that light sensor 107 is located in the lower left quadrant of the upper left quadrant of screen 111.

This process of dividing rectangles into halves to form squares and the subsequent squares in half to form rectangles continues through images 1003e, 1003f, 1003g, 1003h and 1003i until the squares and/or rectangles are on the order of a few pixels in dimension and/or on the order of a size of light sensor 107, to continue to isolate a location of light sensor 107; in other words, the squares or rectangles of image 1003i, can be on the order of a few pixels or less, and/or of a size that is within a given margin of error for locating light sensor 107. For example, when the location of light sensor 107 is to be determined within 10 pixels, the squares or rectangles of image 1003i can be 10 pixels or fewer.

The margin of error (i.e. size of squares or rectangles of image 1003i) can be determined based on a time to project images 1003, receive the associated detection indications, whether transmitted after each image 1003 or whether the sequence is transmitted, and hence determines the location of light sensor 107. For example, returning briefly to the implementations depicted in FIGS. 8 and 9, for apparatus 105 to smoothly "drag" the edge of image 809 using structured light pattern 1001, there should be minimal lag between "grabbing" the edge and "dragging" the edge. Hence, the margin of error can be increased to decrease the lag time, as the larger the margin of error, the faster structured light pattern 1001 will be provided.

In yet further implementations, the margin of error (i.e. size of squares or rectangles of image 1003) can be based on a size of light sensor 107, for example a size of final image 1003 can be about the same size as light sensor 107.

It is further appreciated the sequence of images 1003 enables computing device mean to first determine whether light sensor is located on a left or right hand side of screen 111 and then on a top or bottom of the determined side of screen 111. Each successive image 1003 continues to isolate the position of light sensor to a top or bottom, or to a left or right side of the preceding image. It is further appreciated that rather than start with image 1003a being vertical rectangles, image 1003a could comprise horizontal rectangles.

It is yet further appreciated that not all images 1003 are depicted and that structured light pattern 1001 can comprise any suitable number of images 1003 based on the given margin of error and a size of screen 111.

Indeed, any suitable structured light pattern is within the scope of present implementations, and is not limited to rastered patterns and/or projecting a series of patterns as in structured light pattern 1001. For example, in implementations where light sensor 107 is colour sensitive, structured light pattern comprising a single image of varying colour could be projected onto screen 111, wherein given colours are associated with respective given locations in the structured light pattern. Hence, the structured light pattern is projected and the light sensor 107 detects a colour, the detection indication comprises an indication of the detected colour, which computing device 101 can then map to an associated location.

Similarly, the structured light pattern can comprise any suitable pattern. For example, attention is next directed to FIG. 11, which depicts a structured light pattern 1101 comprising a pattern of numbers, 1, 2, 3, etc., each number associated with a given location in structured light pattern 1101 (e.g. "1", in the upper left corner, "80" in the bottom right corner, etc.). In these implementations, light sensor 107 comprises a camera device, or the like, such that an image of one or more numbers in structured light pattern 1101 can be acquired and transmitted to computing device 101 in a detection indication. Computing device 101 can then map the acquired image comprising one or more of the numbers of structured light pattern 1101 to an associated location. In these locations, the numbers in structured light pattern can be on the order of about a size of light sensor 107 or less than a size of light sensor 107. As size of the numbers can vary with a projection distance between projector 103 and screen 111, when no given number can be extracted from the detection indication, computing device 101 can adjust a size of the numbers in structured light pattern 1101 until a number can be extracted from the detection indication.

Indeed, it is appreciated that any suitable pattern for a structured light pattern, is within the scope of present implementations as long as features in the structured light pattern can be uniquely mapped to locations in the structured light pattern. Hence, patterns of geometric shapes, and the like, are within the scope of present implementations, with each geometric shape in the structured light pattern being unique.

Figure 12:
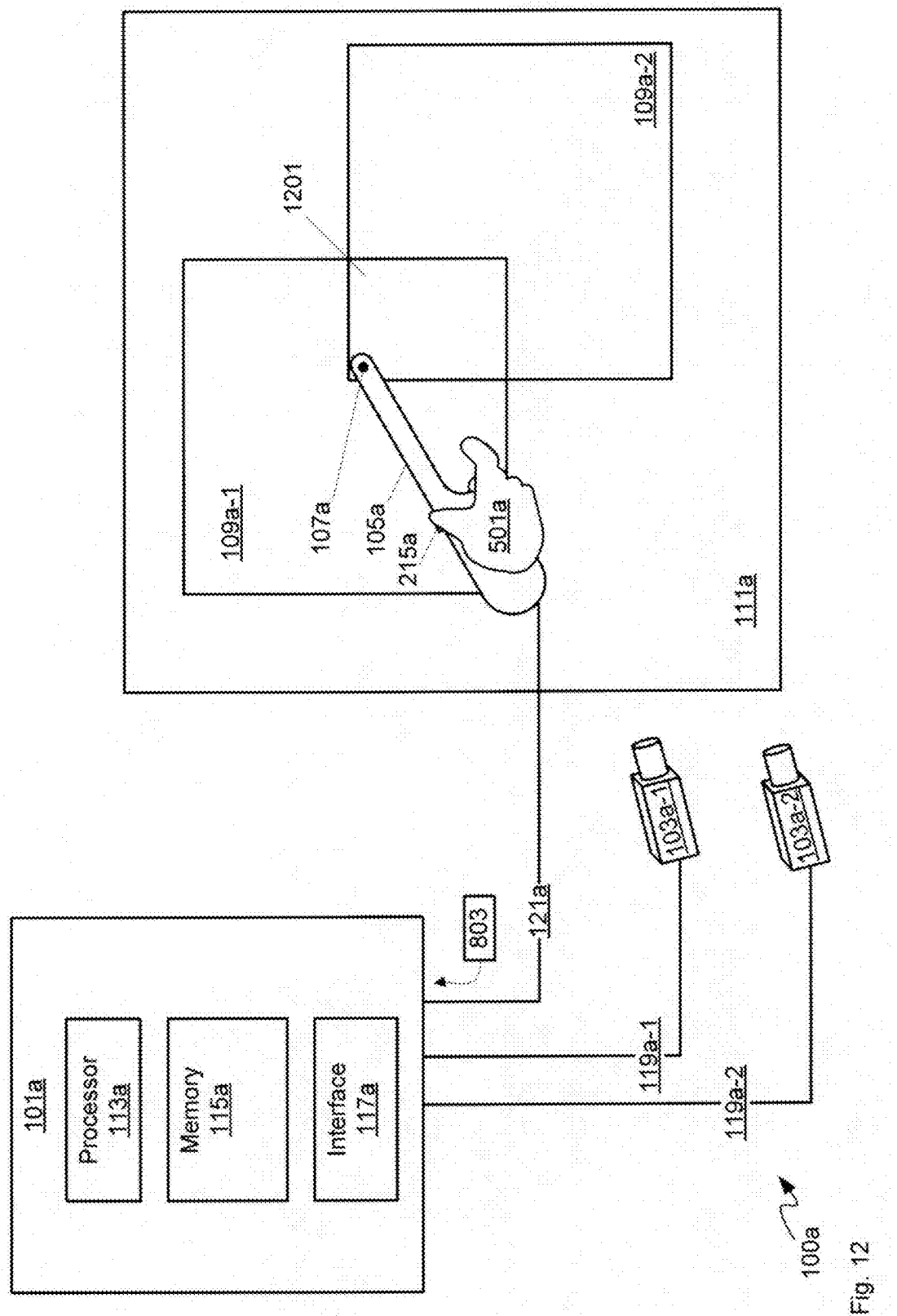
FIG. 12 depicts a system for determining locations of an overlapping area in at least two projected images projected by respective projectors, according to non-limiting embodiments.

Attention is next directed to FIG. 12, which depicts a system 100a similar to system 100, with like elements having like numbers with, however, an "a" appended thereto. System 100a hence comprises a computing device 101a comprising a processor 113a, a memory 115a and an interface 117a, a first projector 103a-1, at least a second projector 103a-2, and an apparatus 105a comprising a light sensor 107a and a button 215a. Computing device 101a is in communication with apparatus 105a via a link 121a, and in communication with projectors 103a-1, 103a-2 via respective links 119a-1, 119a-2. Projectors 103a-1, 103a-2 will be referred to hereafter collectively as projectors 103a, and generically as a projector 103a. In any event, projectors 103a are arranged relative to a screen 111a such each projector. 103a can project into respective areas 109a-1, 109a-2 of screen 111a, area 109a-1, 109a-2 overlapping in an area 1201. Areas 109a-1, 109a-2 will be referred to hereafter collectively as areas 109a, and generically as an area 109a. It is further appreciated that computing device 101a does not, initially, store a position of area 1201 and hence cannot initially blend together overlapping images projected by each projector 103a in respective areas 109a.

To address this, each projector 103a is enabled to project a respective structured light pattern in a respective area 109a. For example, projector 103a-1 is enabled to project a first structured light pattern in area 109a-1, as described above, and projector 103a-2 is enabled to project a second structured light pattern in area 109a-2, the second structured light pattern similar or different from the first structured light pattern. For example, when methods 300, 302, 304 is implemented in system 100a, both structured light patterns can be projected at block 307, in a sequence, when a request to project structured light patterns is transmitted by apparatus 105a at block 301 and received at computing device 101a at block 303. In other words, a user, as represented by hand 501a, positions light sensor 107a at the edge of overlap area 1201 and actuates button 215a, which causes computing device 101a to control each projector 103a to project a respective structured light pattern in a given sequence. For example, projector 103a-1 can project a first structured light pattern and then projector 103a-2 can project a second structured light pattern. Computing device 101a then detects a position of light sensor 107a relative to each of the first and second structured light patterns to determine at least one pixel in the overlap area 1201.

Computing device 101a is hence enabled to determine an overlap area 1201 between the first structured light pattern and the second structured light pattern, respectively projected by projectors 103a-1, 103a-2, by: determining respective positions of light sensor relative each of the first structured light pattern and the second structured light pattern based on receiving: a first detection indication when at least a first pixel in the first structured light pattern is detected by light sensor 107a; and a second detection indication when at least a second pixel in the second structured light pattern is detected by light sensor 107a.

Figure 13:
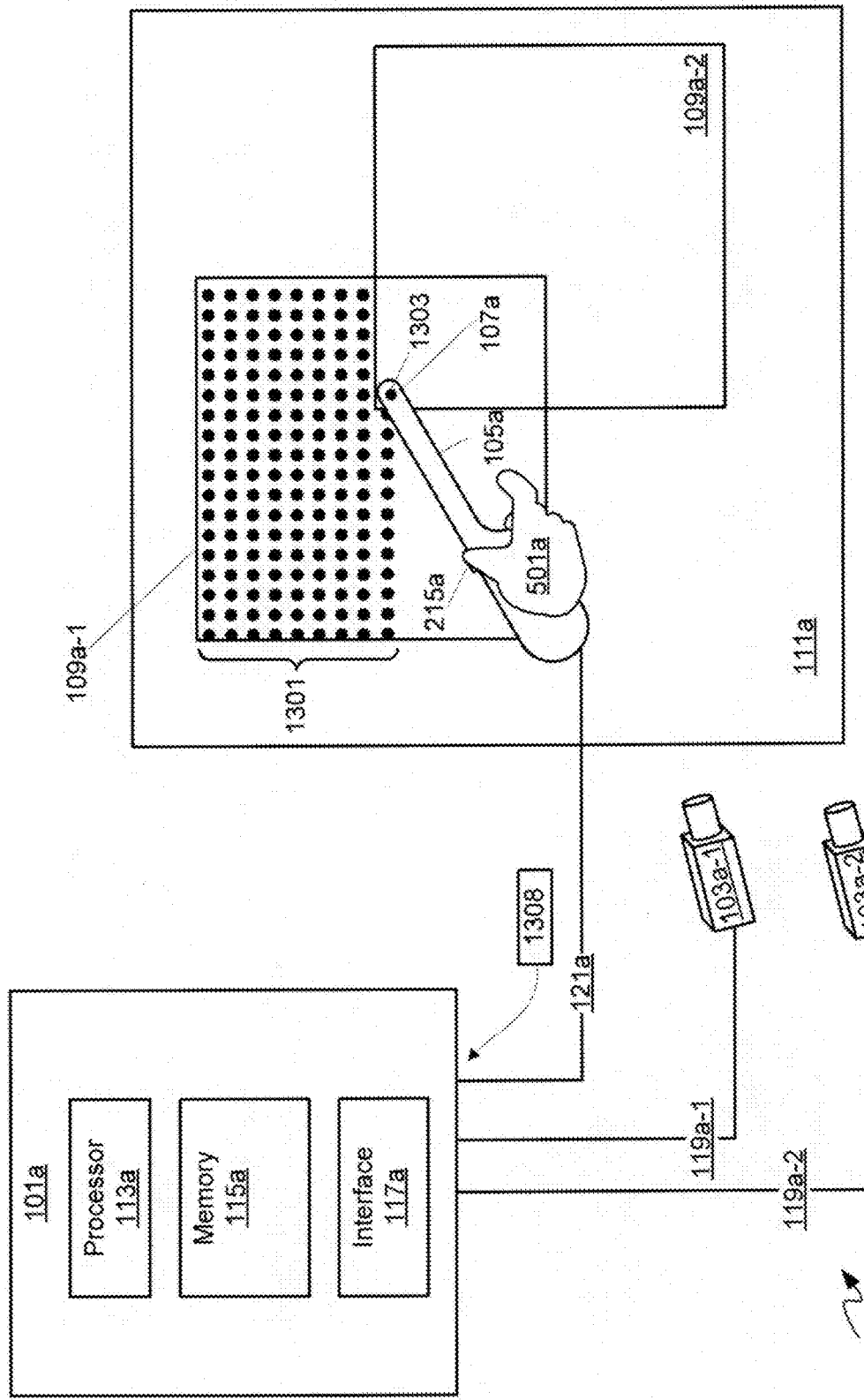
FIG. 13 depicts the system of FIG. 12, with a first structured light pattern projected by a first projector onto a screen, according to non-limiting embodiments.
Figure 14:
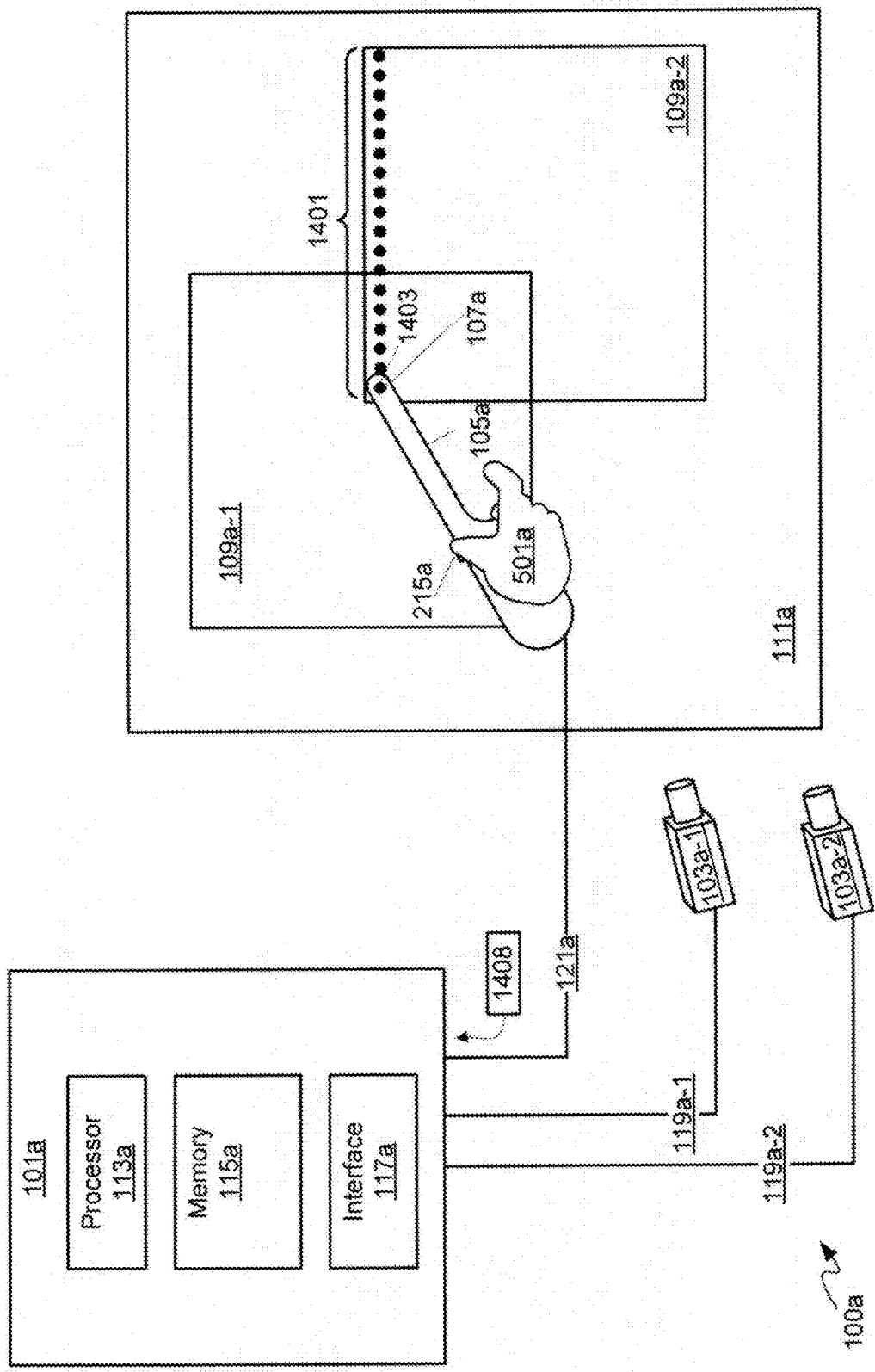
FIG. 14 depicts the system of FIG. 12, with a second structured light pattern projected onto a screen by a second projector, according to non-limiting embodiments.

For example, attention is directed to FIGS. 13 and 14, each of which are similar to FIG. 12, with like elements having like numbers. FIG. 13 depicts projector 103a-1 projecting structured light pattern 1301, similar to structured light pattern 601 described above, and light sensor 107a detecting a given pixel 1303 in structured light pattern 1301, resulting in a detection indication 1308 being transmitted to computing device 101a. It is appreciated that, in FIG. 13, blocks 315 and 317 of FIG. 13 are implemented and projection of structured light pattern 1301 ends after detection indication 1308 is received at computing device 101a. Similarly, FIG. 14 depicts projector 103a-2 projecting structured light pattern 1401, similar to structured light pattern 601 described above, and light sensor 107a detecting a given pixel 1403 in structured light pattern 1401, resulting in a detection indication 1408 being transmitted to computing device 101a. Hence, computing device 101a determines that areas 109a overlap at least at pixels 1303, 1403. Computing device 101a can hence blend together, in overlap area 1201, and at least at pixels 1303, 1403, a first image projected by projector 103a-1 and a second image projected by second projector 103a-2.

In practise, edges of overlap area 1201 can be mapped out via apparatus 105a being used to detect a plurality of overlapping pixels. For example, a user positions light sensor 107a at a plurality of locations at edges of overlap area 1201 and actuates button 215a, resulting in structured light patterns 1301, 1401 being projected a plurality of times, once for each actuation of button 215a and/or once for each location of light sensor 107a. Computing device 101a stores the positions of the overlapping pixels in order to perform the blending; further, the more overlapping pixels that are determined, the more accurate the blending. In other words, apparatus 105a can be used to determine a plurality of pixels in the overlapping region; furthermore, more overlapping pixels can be determined in regions that require more resolution to more accurately determine the blend.

In yet further implementations, each of structured light patterns 1301, 1401 can be projected in a different colour, and light sensor 107a can be enabled to detect both colours. Hence, in these implementations, structured light patterns 1301, 1401 can be projected simultaneously, and light sensor 107a detects light from each independently.

Furthermore, in implementations where light sensor 107a is enable to detect colour, each detection, indication 1308, 1408 can further comprise an indication of colour, such that, colour differences between pixels 1303, 1403 can be taken into account when blending images projected by projectors 103a. For example, each pixel 1303, 1403 can nominally be the same colour; however, as projectors 103a can project in slight colours, the true colour of each pixel 1303, 1403 can be different. Colour differences detected by light sensor 107a can be taken into account by computing device 101a when blending.

It is further appreciated that determination of overlap areas can be extended to more than one overlap area and/or blending/overlap of three or more projectors. For example, in some implementation, three or more projectors can project overlapping images, and each can project a structured light pattern for detection by apparatus 105a; when apparatus 105a is not positioned at one of the overlap areas, then computing device 101a determines that the associated projector is not projecting into the current blend area. Regardless, apparatus 105a can be used to determine a plurality of pixels in each of a plurality of overlap areas for blending images from three or more projectors.

In other words, in projection systems comprising three or more projectors only one or more subsets of images projected there from can overlap and apparatus 105a is used to determine the overlap areas regardless of the combinations in the subsets. While two uses of apparatus 105, 105a have been heretofore described, other uses of apparatus 105, 105a are contemplated. For example, as projection of structured light patterns can be used in combination with apparatus 105, 105a to determine a location of light sensor 107, 107a, apparatus 105, 105a can also be used as a pointing device, for example, to select items in projected images (i.e. images that are projected with a structured light pattern, simultaneously and/or sequentially). In other words, apparatus 105, 105a can be used similar to a mouse at a computer screen to select items including but not limited to menu selections and the like. Hence, once apparatus light sensor 107, 107a is positioned in front of a projected image, and button 215, 215a is actuated, the associated detection indication of at least one pixel in a resulting structured light pattern can be indicative of a selection of an item in the projected image. The projected image can be subsequently updated to reflect the selection of the item and/or a command associated with the item selection executed by computing device 101, 101a.

In any event, by using a structured light pattern projected onto a screen in conjunction with a structured light pattern, a position of a light sensor in front of a screen can be determined and subsequently mapped to projected pixel locations. This can be used to move an edge of a projected image to the extent of a projected area and/or to map out an overlapping area between two or more projected images and/or to make selections of items in a projected image. Techniques described herein are especially useful when using projection screens of complex geometries and/or projection screen that are not manufactured to an intended specification. Hence, a projected image can be easily manipulated to match the actual screen geometry by "dragging" the edges of the projected image to the actual screen geometry using apparatus 105, 105a. Further apparatus 105, 105a can be used to more accurately define an overlapping area of two projected images.

Those skilled in the art will appreciate that in some embodiments, the functionality of computing device 101, 10a, and apparatus 105, 105a can be implemented using pre-programmed hardware or firmware elements (e.g., application specific integrated circuits (ASICs), electrically erasable programmable read-only memories (EEPROMs), etc.), or other related components. In other embodiments, the functionality of computing device 101, 101a, and apparatus 105, 105a can be achieved using a computing device that has access to a code memory (not shown) which stores computer-readable program code for operation of the computing device. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:
1. An apparatus comprising:
   a light sensor;
   a body comprising the light sensor, the body configured to position the light sensor proximal to a screen and between the screen and a projector to detect light from the projector rather than light reflected from the screen;
   a communication interface for communicating with a projector system comprising at least the projector; and,
   a processor configured to:

transmit a request to the projector system to project a structured light pattern using the projector; and when at least one pixel in the structured light pattern projected by the projector is detected at the light sensor, transmit a detection indication to the projector system to communicate detection of the at least one pixel.

2. The apparatus of claim 1, further comprising a button, wherein the processor is further configured to transmit the request when the button is actuated.

3. The apparatus of claim 1, further comprising one or more of: a telescoping accessory for extending the body; and mounting accessories for mounting the body to a device for moving the apparatus relative to the screen.

4. The apparatus of claim 1, wherein the light sensor is configured to detect one or more of light in a human visible spectrum, and an infrared light spectrum.

5. The apparatus of claim 1, wherein the light sensor is configured to detect colour and the detection indication comprises a colour indication of the at least one pixel.

6. The apparatus of claim 1, wherein the light sensor is configured to detect patterns in the structured light pattern and the detection indication comprises an indication of at least a portion of a detected pattern.

7. The apparatus of claim 1, wherein the light sensor comprises one or more of a photodetector, a photodiode, a phototransistor, a charge coupled device, and a camera device.

8. A projector system comprising:
a computing device;
at least one projector configured to communicate with the computing device; and,
an apparatus comprising a light sensor, the apparatus configured to: transmit a request to the computing device to cause the projector to project a structured light pattern at a screen; and when at least one pixel in the structured light pattern projected by the projector is detected at the light sensor, when the light sensor is proximal the screen, transmit a detection indication to the computing device to communicate detection of the at least one pixel,
the computing device configured to:
determine a first position of the light sensor based on receiving the detection indication, the first position associated with an edge of an image projected by the projector;
determine a second position of the light sensor based on receiving a subsequent detection indication from the apparatus when at least a second pixel in the structured light pattern is detected by the light sensor; and,
move at last a portion of the edge of the image from the first position to the second position.

9. The projector system of claim 8, wherein the structured light pattern comprises a raster of pixels projectable by the projector.

10. The projector system of claim 9, wherein the raster ends when the associated indication is received at the computing device.

11. The projector system of claim 8, wherein the structured light pattern comprises a sequence of images which are dynamically adjusted to determine a position of the light sensor, the apparatus further configured to transmit a respective detection indication to the projector system when at least one respective pixel is detected in one or more of the images.

12. The projector system of claim 11, wherein projection of the sequence of images ends when the position of the light sensor is determined within a given margin of error.

13. The projector system of claim 8, wherein the computing device is configured to align an edge of an image projected by the projector with about the at least one pixel.

14. The projector system of claim 8, further comprising at least a second projector configured to project a second structured light pattern when the request is received at the computing device, the structured light pattern and the second structured light pattern projected in a given sequence, the computing device configured to:
determine an overlap area between the structured light pattern and the second structured light pattern by: determining respective positions of the light sensor relative to each of the structured light pattern and the second structured light pattern; and,
blend together, in the overlap area, a first image projected by the projector and a second image projected by the second projector.

15. The projection system of claim 14, wherein the computing device determines a plurality of relative positions of the light sensor for each of the structured light pattern and the second structured light pattern to define the overlap area, each of the plurality of relative positions determined when a respective request is received from the apparatus to cause the projector to project the structured light pattern and the second projector to project the second structured light pattern.

16. The projection system of claim 14, wherein respective colour information is received in each of the detection indication and the second detection indication, the respective colour information used by the computing device to blend colour of the first image and the second image.

17. The projector system of claim 8, wherein the structured light pattern comprises a pattern of features associated with given locations in the structured light pattern.

18. The projection system of claim 8, wherein the structured light pattern is projected in an infrared light spectrum, the light sensor configured to detect infrared light, and the structured light pattern is projected with an image in a human visible light spectrum.

19. The projection system of claim 8, wherein the detection indication is further indicative of selection of an item in an image projected onto the screen.

20. The projection system of claim 8, further comprising a device for moving the apparatus relative to the screen.

* * * * *

UNITED STATES PATENT AND TRADEMARK OFFICE
CERTIFICATE OF CORRECTION

PATENT NO. : 8,922,486 B2
APPLICATION NO. : 13/556378
DATED : December 30, 2014
INVENTOR(S) : Charles Harland, Kevin Wright and Kevin Moule Page 1 of 1

It is certified that error appears in the above-identified patent and that said Letters Patent is hereby corrected as shown below:

In the Claims

Column 17, line 51, Claim 8, "last" should read -- least --.

Signed and Sealed this
Eighth Day of December, 2015

Michelle K. Lee
*Director of the United States Patent and Trademark Office*